United States Patent
Jiang et al.

(10) Patent No.: US 9,344,736 B2
(45) Date of Patent: May 17, 2016

(54) SYSTEMS AND METHODS FOR COMPRESSIVE SENSE IMAGING

(71) Applicant: Alcatel-Lucent USA Inc., Murray Hill, NJ (US)

(72) Inventors: Hong Jiang, Warren, NJ (US); Gang Huang, Monroe Township, NJ (US); Paul Albin Wilford, Bernardsville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 139 days.

(21) Appl. No.: 14/315,909

(22) Filed: Jun. 26, 2014

(65) Prior Publication Data

US 2015/0382000 A1    Dec. 31, 2015

(51) Int. Cl.
| | |
|---|---|
| *G06K 9/36* | (2006.01) |
| *G06K 9/46* | (2006.01) |
| *H04N 19/44* | (2014.01) |
| *H04N 19/48* | (2014.01) |
| *H04N 19/51* | (2014.01) |
| *H04N 19/169* | (2014.01) |
| *H04N 19/85* | (2014.01) |

(52) U.S. Cl.
CPC .............. *H04N 19/44* (2014.11); *H04N 19/169* (2014.11); *H04N 19/48* (2014.11); *H04N 19/51* (2014.11); *H04N 19/85* (2014.11)

(58) Field of Classification Search
CPC ....... H04N 19/44; H04N 19/48; H04N 19/51; H04N 19/169
See application file for complete search history.

(56) References Cited

U.S. PATENT DOCUMENTS

| | | |
|---|---|---|
| 3,775,602 A | 11/1973 | Alexandridis et al. |
| 5,070,403 A | 12/1991 | Wilkinson |
| 5,166,788 A | 11/1992 | Lee |
| 5,262,854 A | 11/1993 | Ng |
| 5,519,206 A | 5/1996 | Uwira |
| 5,555,023 A | 9/1996 | Maenaka et al. |
| 5,572,552 A | 11/1996 | Dent et al. |

(Continued)

FOREIGN PATENT DOCUMENTS

| | | |
|---|---|---|
| JP | 2008-028538 | 7/2008 |
| WO | 2006041219 A2 | 4/2006 |

(Continued)

OTHER PUBLICATIONS

Huang, et al., "Lensless Imaging by Compressive Sensing," accepted for presentation at IEEE International Conference on Image Processing, ICIP 2013, May 2013.

(Continued)

*Primary Examiner* — Phuoc Tran
(74) *Attorney, Agent, or Firm* — Niraj A. Desai (57) ABSTRACT

Systems and methods for compressive sense imaging are provided. In one aspect, a system and method is provided for determining at least one kernel matrix based on the relative motion of an object during a time period corresponding to the acquisition of one or more compressive measurements of the object. An uncompressed image of the object is generated using the compressive measurements using a reconstruction basis matrix that is different from the compressive basis matrix used to acquire the compressive measurements of the object. To compensate for the relative motion of the object, the reconstruction basis matrix is determined based on the at least one kernel matrix and the compressive basis matrix.

20 Claims, 4 Drawing Sheets

(56) References Cited

U.S. PATENT DOCUMENTS

| | | | |
|---|---|---|---|
| 5,870,144 | A | 2/1999 | Guerrera |
| 6,057,909 | A | 5/2000 | Yahav et al. |
| 6,148,107 | A | 11/2000 | Ducloux et al. |
| 6,271,876 | B1 | 8/2001 | McIntyre et al. |
| 6,356,324 | B1 | 3/2002 | Nishiguchi et al. |
| 6,718,287 | B2 | 4/2004 | Oostveen et al. |
| 7,345,603 | B1 | 3/2008 | Wood et al. |
| 7,602,183 | B2 | 10/2009 | Lustig et al. |
| 7,680,356 | B2 | 3/2010 | Boyce et al. |
| 7,928,893 | B2 | 4/2011 | Baraniuk et al. |
| 8,125,883 | B2 | 2/2012 | Aulin |
| 8,204,126 | B2 | 6/2012 | Tsuda et al. |
| 8,644,376 | B2 | 2/2014 | Jiang et al. |
| 9,230,302 | B1* | 1/2016 | Owechko .............. G06T 3/4053 |
| 2002/0075990 | A1 | 6/2002 | Lanza et al. |
| 2002/0080264 | A1 | 6/2002 | Konno |
| 2003/0002746 | A1 | 1/2003 | Kusaka |
| 2003/0043918 | A1 | 3/2003 | Jiang et al. |
| 2003/0197898 | A1 | 10/2003 | Battiato et al. |
| 2004/0174434 | A1 | 9/2004 | Walker et al. |
| 2004/0264580 | A1 | 12/2004 | Chiang Wei Yin et al. |
| 2005/0058352 | A1 | 3/2005 | Deliwala |
| 2005/0207498 | A1 | 9/2005 | Vitali et al. |
| 2006/0044453 | A1 | 3/2006 | Dong-whan Lee |
| 2006/0125975 | A1 | 6/2006 | Mai et al. |
| 2006/0157640 | A1 | 7/2006 | Perlman et al. |
| 2006/0203904 | A1 | 9/2006 | Lee |
| 2006/0239336 | A1 | 10/2006 | Baraniuk et al. |
| 2006/0293865 | A1 | 12/2006 | Kobayashi et al. |
| 2007/0009169 | A1 | 1/2007 | Bhattacharjya |
| 2007/0081200 | A1 | 4/2007 | Zomet et al. |
| 2007/0285554 | A1 | 12/2007 | Givon |
| 2008/0025624 | A1 | 1/2008 | Brady |
| 2008/0062287 | A1 | 3/2008 | Agrawal et al. |
| 2008/0152296 | A1 | 6/2008 | Oh et al. |
| 2009/0066818 | A1 | 3/2009 | Lim et al. |
| 2009/0136148 | A1 | 5/2009 | Lim et al. |
| 2010/0091134 | A1 | 4/2010 | Cooke et al. |
| 2010/0111368 | A1 | 5/2010 | Watanabe |
| 2010/0165163 | A1 | 7/2010 | Matsuda |
| 2010/0189172 | A1 | 7/2010 | Pateux et al. |
| 2010/0201865 | A1 | 8/2010 | Han et al. |
| 2011/0150084 | A1 | 6/2011 | Choi et al. |
| 2011/0150087 | A1 | 6/2011 | Kim et al. |
| 2011/0157393 | A1 | 6/2011 | Zomet et al. |
| 2012/0044320 | A1 | 2/2012 | Spivey et al. |
| 2012/0069209 | A1 | 3/2012 | Gudlavalleti et al. |
| 2012/0076362 | A1 | 3/2012 | Kane et al. |
| 2012/0082208 | A1 | 4/2012 | Jiang et al. |
| 2012/0098950 | A1 | 4/2012 | Zheng et al. |
| 2012/0105655 | A1 | 5/2012 | Ishii et al. |
| 2012/0189047 | A1 | 7/2012 | Jiang et al. |
| 2012/0213270 | A1 | 8/2012 | Baraniuk et al. |
| 2012/0218379 | A1 | 8/2012 | Ozcan et al. |
| 2013/0002968 | A1 | 1/2013 | Bridge et al. |
| 2013/0044818 | A1 | 2/2013 | Jiang Hong et al. |
| 2013/0070138 | A1 | 3/2013 | Baraniuk et al. |
| 2013/0201343 | A1 | 8/2013 | Jiang Hong et al. |
| 2013/0335256 | A1* | 12/2013 | Smith .................... G01S 13/887 342/22 |
| 2014/0198236 | A1* | 7/2014 | Herman ................. H04N 5/335 348/239 |
| 2015/0049210 | A1 | 2/2015 | Rachlin et al. |

FOREIGN PATENT DOCUMENTS

| | | | |
|---|---|---|---|
| WO | 2006125975 | A1 | 11/2006 |
| WO | 2012001463 | A1 | 1/2012 |
| WO | 2012/044468 | A1 | 4/2012 |
| WO | 2013007272 | A1 | 1/2013 |
| WO | 2013/119593 | A1 | 8/2013 |
| WO | 2014/035535 | A1 | 3/2014 |

OTHER PUBLICATIONS

Jiang, et al., "Multi-View in Lensless Compressive Imaging," Picture Coding Symposium 2013, Dec. 2013.
Candes, et al., "Stable Signal Recovery From Incomplete and Inaccurate Measurements," Applied and Computational Mathematics, Caltech, Pasadena, CA 91125; Department of Mathematics, University of California, Los Angeles, CA 90095, Feb. 2005; Revised Jun. 2005, pp. 1-15.
Chan, et al., "A Single-Pixel Terahertz Imaging System Based on Compressed Sensing," Applied Physics Letters, vol. 93, No. 12, pp. 121105-121105-3, Sep. 2008.
Park, et al., "A Geometric Approach to Multi-View Compressive Imaging," EURASIP Journal on Advances in Signal Processing 2012, pp. 1-15, http://asp.eurasipjournals.com/content/2012/1/37.
Zomet, et al., "Lensless Imaging With a Controllable Aperture," IEEE Conference on Computer Vision and Pattern Recognition (CVPR), Jun. 2006, 0-7695-2597-0/06.
Heidari, et al., "A 2D Camera Design With a Single-Pixel Detector," in IRMMW-THz 2009, IEEE, pp. 1-2, 2009.
Takhar, et al., "A New Compressive Imaging Camera Architecture Using Optical-Domain Compression," Proc. IS&T/SPIE Computational Imaging IV, Jan. 2006.
Jiang, et al., "Surveillance Video Processing Using Compressive Sensing, " Manuscript submitted to AIMS' Journals, pp. 1-14, arXiv:1302.1942v1 [cs.CV] Feb. 8, 2013.
Romberg, "Imaging Via Compressive Sampling," IEEE Signal Processing Magazine, pp. 14-20, Mar. 2008.
Babacan, et al., "Compressive Passive Millimeter-Wave Imaging," 2011 18th IEEE International Conference on Impage Processing, pp. 2705-2708.
Duarte, et al., "Single-Pixel Imaging Via Compressive Sampling," IEEE Signal Processing Magazine, vol. 25, No. 2, pp. 83-91, Mar. 1, 2008, XP011225667.
Goyal, et al., "Compressive Sampling and Lossy Compression," IEEE Signal Processing Magazine, pp. 48-56, Mar. 2008.
Jiang, et al., "Scalable Video Coding Using Compressive Sensing," Bell Labs Technical Journal, vol. 16, No. 4, pp. 149-169, 2012.
Li, et al., "A New Compressive Video Sensing Framework for Mobile Broadcast," IEEE Transactions on Broadcasting, vol. 59, No. 1, Mar. 2013.
Donoho, "Compressed Sensing," IEEE Transactions on Information Theory, vol. 52, No. 4, Apr. 2006.
Robucci, et al., "Compressive Sensing on a CMOS Separable-Transform Image Sensor," vol. 98, No. 6, Jun. 2010, Proceedings of the IEEE, pp. 1089-1101.
International Search Report and Written Opinion of the International Searching Authority for International application No. PCT/US2011/051730 mailed Dec. 15, 2011, 13 pages.
International Search Report and Written Opinion of the International Searching Authority for International application No. PCT/US2011/051726 mailed Nov. 14, 2011.
Cossalter, et al., "Joint Compressive Video Coding and Analysis," IEEE Transactions on Multimedia, IEEE Service Center, Piscataway, NJ, US vol. 12, No. 3, Apr. 1, 2010, pp. 168-183, XLPO11346672.
Dadkhah, et al., "Compressive Sensing With Modified Total Variation Minimization Algorithm," Acoustic Speech and Signal Processing (ICASSP), 2010 IEEE International Conference ON, IEEE, Piscataway, NJ, US, Mar. 14, 2010, pp. 1310-1313, XP031697373.
Huihui, et al., "Compressive Sensing for DCT Image," Computational Aspects of Social Networks (CASON), 2010 International Conference ON, IEEE, Piscataway, NJ, US, Sep. 26, 2010, pp. 378-381.
Chengbo Li, "An Efficient Algorithm for Total Variation Regularization With Applications to the Single Pixel Camera and Compressive Sensing," Thesis Submitted in Partial Fulfillment of the Requirement for the Degree Master of Arts, Sep. 20, 2009, pp. 1-93, XP55010819, Retrieved from the internet: URL:http://scholarship.rice.edu/bitstream/handle/1911/62229/1486057.PDR?sequence=1 (Retrieved Oct. 31, 2011).

(56) References Cited

OTHER PUBLICATIONS

Li, et al., "Video Coding Using Compressive Sensing for Wireless Communications," Wireless Communications and Networking Conference (WCNC), 2011 IEEE, IEEE, Mar. 28, 2011., pp. 2077-2082, XP031876593.

Jiang, et al., "Arbitrary Resolution Video Coding Using Compressive Sampling, "Workshop on Picture Coding and Image Processing 2010, Dec. 7, 2010, pp. 1-2.

Park, et al., "A Multiscale Framework for Compressive Sensing of Video," in Picture Coding Simposium, Chicago, IL, May 2009, 4 pages.

Drori, Iddo, "Compressed Video Sensing," BMVA symposium on 3D video analysis, display, and applications, 2008, two pages.

Wakin, et al., "Compressive Imaging for Video Representation and Coding," in Picture Coding Symposium (Beijing, China), Apr. 2006, six pages.

Dugad, et al., "A Fast Scheme for Image Size Change in the Compressed Domain," IEEE Transactions on Circuits and Systems for Video Technology, vol. 11, No. 4, Apr. 1, 2011, pp. 461-474.

Deng, et al., "Robust Image Compression Based on Compressive Sensing," Multimedia and Expo (ICME), Jul. 19, 2012, pp. 462-467.

Hyder, et al., "A Scalable Distributed Video Coder Using Compressed Sensing," India conference, Dec. 8, 2009, pp. 1-4.

Gao, et al., "A Robust Image Transmission Scheme for Wireless Channels Based on Compressive Sensing," Aug. 18, 2012, pp. 334-341.

CCD and CMOS Sensor Technology, 2010, AXIS Communications, pp. 1-8.

Bogaerts, et al., "High-End CMOS Active Pixel Sensors for Space-Borne Imaging Instruments," 2005, FillFactory, 9 pages.

Doering, Roger William, "A Tri-Color-Pixel Digital-Micromirror Video Chip," A2001, UCLA, pp. 1-180.

Ouni, et al., "New Low Complexity DCT Based Video Compression Method," 2009, ICT 09, pp. 202-207.

Turchetta, et al., "Monolithic Active Pixel Sensors (MAPS) in a VLSI CMOS Technology," 2003, Science Direct, pp. 251-259.

Park, Sahng-Gyu, "Adaptive Lossless Video Compression," A Thesis Submitted to the Faculty of Purdue University in Partial Fulfillment of the Requirements for the Degree of Doctor of Philosophy, Dec. 2003, pp. 1-105.

Robucci, et al., "Compressive Sensing on a CMOS Separable Transform Image Sensor," School of Electrical and Computer engineering, Atlanta, GA, 2008 IEEE, pp. 5125-5128.

Wikipedia Article on Shutter Photography dated Oct. 6, 2011—1 page.

International Preliminary Report on Patentability and Written Opinion of the International Searching Authority for International application No. PCT/US2013/024821 dated Aug. 12, 2014, 9 pages.

International Preliminary Report on Patentability and Written Opinion of the International Searching Authority for International Application No. PCT/US2013/024821 dated Apr. 26, 2013, 14 pages.

International Search Report and Written Opinion of the International Searching Authority for International Application No. PCT/US2013/064962 dated Dec. 16, 2013, 12 pages.

S.G. Lipson and A. Lipson, 'Optical Physics', 4th Edition, Cambridge University Press, Chapter 8, 2011. 46 pages.

Guang-Ming Shi et al: High Resolution Image Reconstruction: A New Imager Via Movable Random Exposure: Image Processing (ICIP), 2009 16TH IEEE, Piscataway, NJ, USA, Nov. 7, 2009, XP031628383, DOI: 10.1109/ICIP.2009.5413684 ISBN: 978-1-4244-5653-6, 4 pages.

International Search Report PCT/US2015/036314, date of Mailing Aug. 26, 2015—4 pages.

Guang-Ming Shi et al: "High Resolution Image Reconstruction: A New Imager Via Movable Random Exposure", 16th IEEE International Conference on Image Processing (ICIP), 2009, IEEE, Piscataway, NJ, USA, Nov. 7, 2009, pp. 1177-1180, XP031628383, DOI: 10.1109/ICIP.2009.54133684 ISBN: 978-1-4244-5653-6 abstract; figures 2,4 Sections 1-4.

Wang Zelong et al: "Superresolution Imaging by Dynamic Single-Pixel Compressive Sensing System", Optical Engineering, Society of Photo-Optical Instrumentation Engineers, Bellingham, vol. 52, No. 6, Jun. 1, 2013, p. 63201, XP060025857, ISSN: 0091-3286, DOI: 10.1117/1.OE.52.6.063201(retrieved on Jun. 3, 2013) abstract; figure 6 Sections 2-4, 5,2.

Ramesh Raskar et al: "Coded Exposure Photography: Motion Deblurring Using Fluttered Shutter", ACM Transactions on Graphics (TOG), ACM, US, vol. 25, No. 3, Jul. 1, 2006, pp. 795-804, XP002467982, ISSN: 0730-0301, DOI: 10.1145/1141911.1141957, abstract Sections 1.2, 5.

Duarte M F et al: "Single-Pixel Imaging Via Compressive Sampling", IEEE Signal Processing Magazine, IEEE Service Center, Piscataway, NJ, US, vol. 25, No. 2, Mar. 1, 2008, pp. 83-91, XP011225667, ISSN: 1053-5888, DOI:10.1109/MSP.2007/914730 the whole document.

International Search Report of the International Searching Authority for International Application No. PCT/US2015/035979 filed on Jun. 16, 2015—date of mailing : Sep. 8, 2015—4 pages.

\* cited by examiner

SYSTEMS AND METHODS FOR COMPRESSIVE SENSE IMAGING

CROSS-REFERENCE

The present application references subject matter of the following U.S. applications, each of which is incorporated by reference herein in its entirety: U.S. application Ser. No. 13/658,904 filed on Oct. 24, 2012 and entitled "Resolution and Focus Enhancement"; U.S. application Ser. No. 13/658,900 filed on Oct. 24, 2012 and entitled "Lensless Compressive Image Acquisition"; U.S. application Ser. No. 13/367,413 filed on Feb. 7, 2012 and entitled "Lensless Compressive Image Acquisition"; and, U.S. application Ser. No. 12/894,855 filed on Sep. 30, 2010 and entitled "Apparatus and Method for Generating Compressive Measurements of Video Using Spatial and Temporal Integration", which issued as U.S. Pat. No. 8,644,376 on Feb. 4, 2014.

TECHNICAL FIELD

The present disclosure is directed to systems and methods for compressive sense image processing.

BACKGROUND

This section introduces aspects that may be helpful in facilitating a better understanding of the systems and methods disclosed herein. Accordingly, the statements of this section are to be read in this light and are not to be understood or interpreted as admissions about what is or is not in the prior art.

Digital image/video cameras acquire and process a significant amount of raw data. In order to store or transmit image data efficiently, the raw pixel data for each of the N pixels of an N-pixel image is first captured and then typically compressed using a suitable compression algorithm for storage and/or transmission. Although compression after capturing the raw data for each of the N pixels of the image is generally useful for reducing the size of the image (or video) captured by the camera, it requires significant computational resources and time. In addition, compression of the raw pixel data does not always meaningfully reduce the size of the captured images.

A more recent approach, known as compressive sense imaging, acquires compressed image (or video) data using random projections without first collecting the raw data for all of the N pixels of an N-pixel image. For example, a compressive measurement basis is applied to obtain a series of compressive measurements which represent the encoded (i.e., compressed) image. Since a reduced number of compressive measurements are acquired in comparison to the raw data for each of the N pixel values of a desired N-pixel image, this approach can significantly eliminate or reduce the need for applying compression after the raw data is captured.

BRIEF SUMMARY

Systems and methods for compressive sense imaging are provided. In one aspect, a system and method includes determining at least one kernel matrix based on relative motion of an object during a time period corresponding to acquisition of at least one of a plurality of compressive measurements representing a compressed image of the object; determining a reconstruction basis matrix to compensate for the relative motion of the object during the time period based on the at least one kernel matrix; and, generating an uncompressed image of the object from the plurality of compressive measurements using the reconstruction basis matrix.

In some aspects, the reconstruction basis matrix is determined by applying the at least one kernel matrix to at least one basis of a compressive basis matrix used to acquire the compressive measurements.

In some aspects, the at least one kernel matrix is determined such that a matrix operation between the at least one kernel matrix and a one-dimensional representation of the uncompressed image represents shifting the position of the object in the one-dimensional representation of the uncompressed image to a previous position of the object based on the relative motion of the object.

In some aspects, motion data from one or more sensors is used to determing the relative motion of the object during the time period.

In some aspects, a degree of the relative motion of the object is determined for the time period using the motion data.

In some aspects, the determined degree of relative motion of the object is used to determine at least one kernel matrix.

In some aspects, a sparsifying operator is used for generating the image of the object from the plurality of compressive measurements using the reconstruction basis matrix.

In some aspects, compressive measurements are acquired using a compressive basis matrix during the time period.

In some aspects, an aggregated sum of light output by a detector is determined to acquire at least one of the compressive measurements. In some aspects, the aggregated sum of light is determined by selective enabling or disabling one or more aperture elements of an aperture array based on at least one basis in the compressive basis matrix during the time period.

DETAILED DESCRIPTION

Various aspects of the disclosure are described below with reference to the accompanying drawings, in which like numerals refer to like elements in the description of the figures. The description and drawings merely illustrate the principles of the disclosure; various structures, systems and devices are described and depicted in the drawings for purposes of explanation only and so as not to obscure the present invention with details that are well known to those skilled in the art, who will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The singular forms "a", "an", and "the" are intended to include the plural forms as well, unless the context clearly indicates otherwise. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Figure 1:
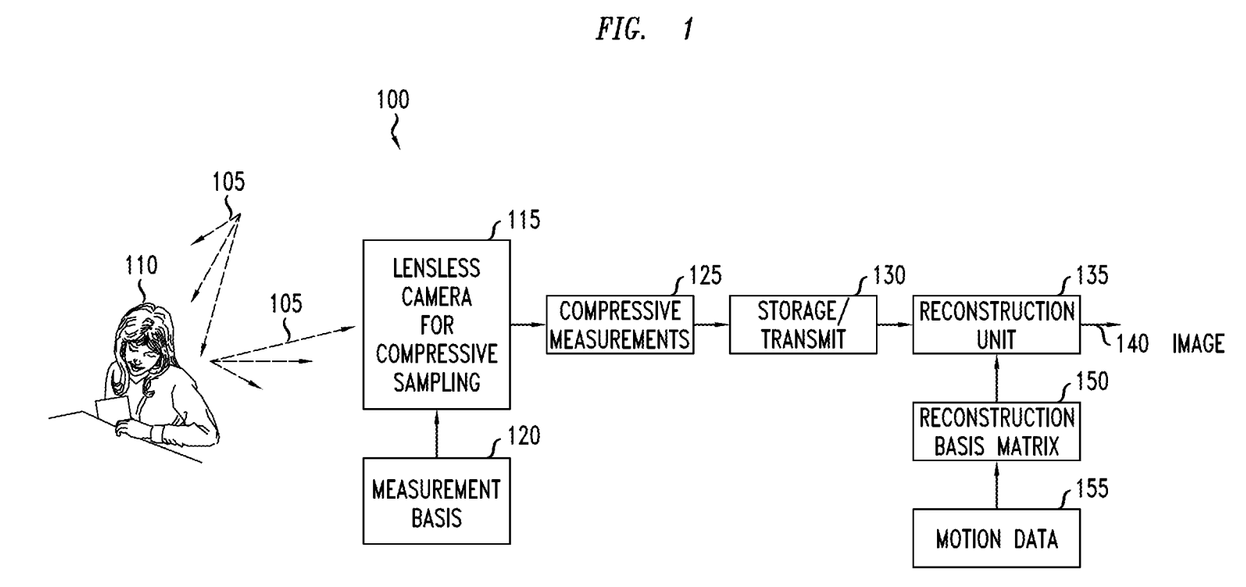
FIG. 1 illustrates an example of a compressive sense imaging system in accordance with various aspects of the disclosure.

FIG. 1 illustrates a schematic example of a compressive imaging acquisition and reconstruction system 100 ("system 100") in accordance with an aspect of the present disclosure. Incident light 105 reflecting from an object 110 is received by the camera unit 115, which uses a predetermined compressive measurement basis matrix (referenced hereinafter as "compressive basis matrix") 120, also sometimes referenced as a sensing or measurement matrix, to generate compressive measurements 125 representing the compressed image of the object 110. The compressive measurements 125 representing compressed image of the object 110 may be stored (or transmitted) by a storage/transmission unit 130.

The reconstruction unit 135 generates an uncompressed image 140 (e.g., for display on a display unit) of the object 110 from the compressive measurements 125. One feature of the present disclosure is that the reconstructed or uncompressed image 140 is generated from the compressive measurements 125 while taking into account motion data that represents the motion of the object 110 relative to the camera unit 115. In one aspect, the reconstructed image 140 is generated using a reconstruction basis matrix 150 that is different from the compressive basis matrix 120 that is used to generate the compressive measurements 125. Another feature of the present disclosure is that the reconstruction basis matrix 150 is determined (e.g., generated or updated) based on motion data 155 that represents motion of the object 110 relative to the camera unit 115. These and other aspects of the present disclosure are described in detail further below.

Although the units are shown separately in FIG. 1, this is merely to aid understanding of the disclosure. In other aspects the functionality of any or all of the units described above may be implemented using fewer or greater number of units. Furthermore, the functionality attributed to the various units may be implemented in a single processing device or distributed amongst multiple processing devices. Some examples of suitable processing devices include cameras, camera systems, mobile phones, personal computer systems, tablets, set-top boxes, smart phones or any type of computing device configured to acquire, process, or display image data.

In one embodiment, a single processing device may be configured to provide the functionality of each of the units of system 100. The single processing device may include, for example, a memory storing one or more instructions, and a processor for executing the one or more instructions, which, upon execution, may configure the processor to provide functionality ascribed to the units. The single processing device may include other components typically found in computing devices, such as one or more input/output components for inputting or outputting information to/from the processing device, including a camera, a display, a keyboard, a mouse, network adapter, etc.

In another embodiment, a local processing device may be provided at a first location that is communicatively interconnected with a remote processing device at a remote location via network. The local processing device may be configured with the functionality to generate and provide the compressive measurements 125 of the local object 110 to a remote processing device over the network. The remote processing device, in turn, may be configured to receive the compressive measurements from the local processing device, to generate the reconstructed image 140 from the compressive measurements 125 using the reconstruction basis matrix 150, and to display the reconstructed image to a remote user in accordance with the aspects described below. The local processing device and the remote processing device may be respectively implemented using an apparatus similar to the single processing device, and may include a memory storing one or more instructions, a processor for executing the one or more instructions, and various input/output components as in the case of the single processing device. The network may be an intranet, the Internet, or any type or combination of one or more wired or wireless networks.

Prior to describing exemplary aspects for the reconstruction of the uncompressed image 140 from the compressive measurements 125, an example embodiment of a camera unit 115 suitable for compressive sense imaging is first described below. Although a particular embodiment of the camera unit 115 is described, this is not to be construed as a limitation, and the principles of the disclosure may be applied to other embodiments of compressive sense image acquisition systems.

Figure 2:
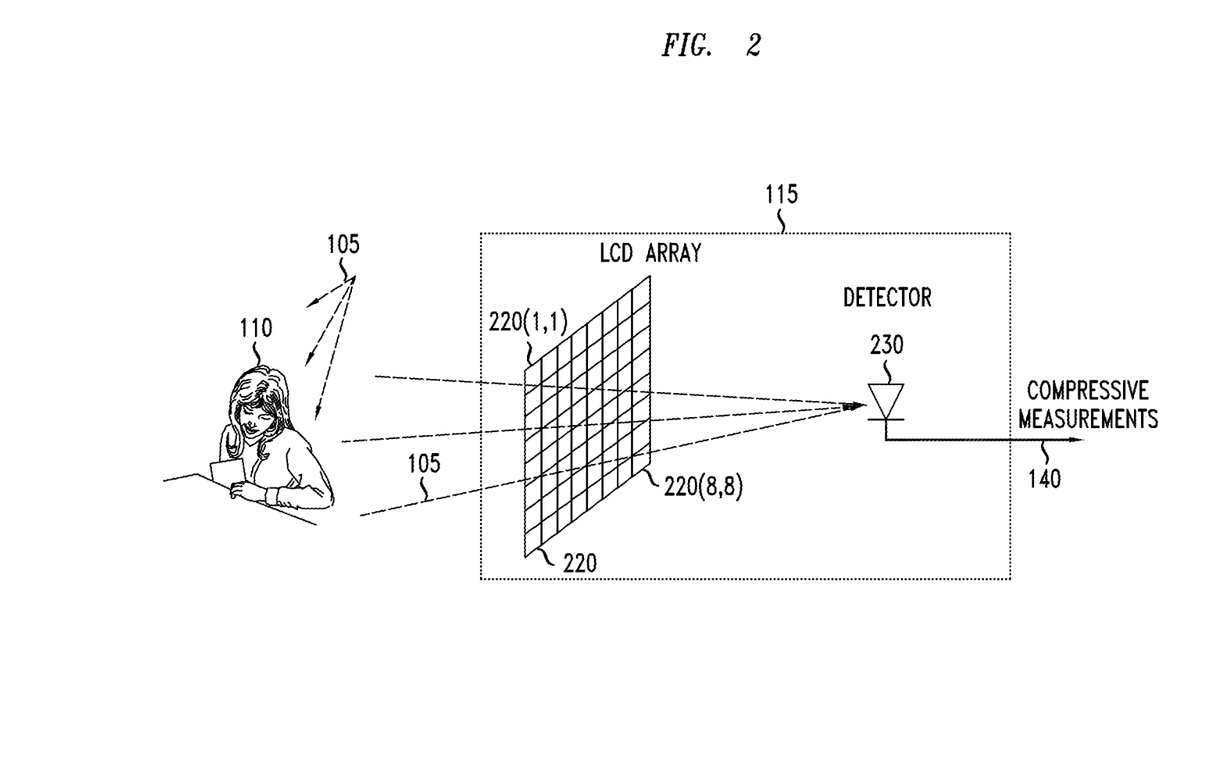
FIG. 2 illustrates an example of a camera unit for acquiring compressive measurements of an object using a compressive basis matrix in accordance with one aspect of the disclosure.

FIG. 2 illustrates an example of a camera unit 115 for acquiring compressive measurements 125 representing the compressed image of the object 110 using compressive sense imaging. Incident light 105 reflected off the object 110 is received (e.g., via an optical lens or without) at the camera unit 115 where the light 105 is selectively permitted to pass through an aperture array 220 of N individual aperture elements and strike a photon detector 230.

The camera unit 115 processes the output of the photon detector 230 in conjunction with the predetermined compressive basis matrix 120 to produce M compressive measurements 125 using compressive sense imaging. As will be understood by one or ordinary skill in the art, the M compressive measurements 125 collectively represent the compressed image of the object 110. More particularly, in compressive sense imaging, the number M of the compressive measurements that are acquired is typically significantly less than the N raw data values that are acquired in a conventional camera system having an N-pixel sensor for generating an N-pixel image, thus reducing or eliminating the need for further compression of the raw data values after acquisition.

In practice, the number of compressive measurements M may be pre-selected relative to the N aperture elements of the array 220 based upon the pre-determined (e.g., desired) balance between the level of compression and the quality of the N-pixel image 140 that is reconstructed using the M compressive measurements.

The example array 220 illustrated in FIG. 2 is a two dimensional, 8×8 array of sixty-four (N=64) discrete aperture elements, which are arranged in two dimensional row and column format such that individual elements of the array 220 may be uniquely identified using a tabular notation form "[row, column]". Thus, the first element in the first row of array 220 is exemplarily referenced as 220[1,1], and the last element in the last row of the array 220 is referenced as 220[8,8].

In practice, the size and format of the array 220 may have a significantly greater (or fewer) number of elements, depending on the desired resolution of the image 140. By way of example only, the array 220 may be a 640×480 (N=307, 200) element array for a desired image resolution of 640×480 pixels for the image 140, or may be a 1920×1080 (N=2,073, 600) element array for a correspondingly greater desired resolution of the image 140.

Each of the sixty-four aperture elements 220[1,1] to 220 [8,8] of the array 220 illustrated in FIG. 2 may be selectively and individually opened or closed (or partially opened or partially closed) to respectively allow or block portions of the light 105 from passing through those elements and reaching the photon detector 230. Aperture elements that are fully or partially opened (e.g., enabled or activated) allow a portion of the light 105 to pass through the array 220 and reach the photon detector 230 via the opened elements, whereas aperture elements that are fully or partially closed (e.g., disabled or deactivated) prevent or block portions of the light 105 from passing via the closed elements of the array 220 and reaching the photon detector 230. In one aspect, for example, the aperture array 220 may be implemented as a micro-mirror array of N individually selectable micro-mirrors. In another embodiment, the aperture array 120 may be implemented as an LCD array.

Operationally, the camera unit 115 is configured to selectively enable or disable (e.g., partially or fully) one or more of the N aperture elements of the array 220 in accordance with compressive basis information of the compressive basis matrix 120 and to determine the number M of compressive measurements $Y_1, Y_2, \ldots Y_M$. As noted previously, in order to achieve compression, the number M of the compressive measurements $Y_1, Y_2, \ldots Y_M$ is fewer than the number N aperture elements of the array 220.

Each of the compressive measurements $Y_k$ ($k \in [1 \ldots M]$) may be understood as the detected sum (or aggregate) of the light 105 reaching the detector 230 through the array 220 during a respective measurement time $t_k$ when particular ones of the N aperture elements of the array 220 are selectively opened (or enabled) and closed (or disabled) in accordance with the corresponding basis $b_k$ ($k \in [1 \ldots N]$) in the compressive basis matrix 120. The compressive measurements $Y_1, Y_2, \ldots Y_M$ may thus be generated during respective times $t_1, t_2, \ldots t_M$ using respective ones of the compressive bases $b_1, b_2, \ldots b_M$ of the compressive basis matrix 120.

The compressive basis matrix 120 is the set of M compressive bases $b_1, b_2, \ldots b_M$, each of which is respectively applied to the array 220 to produce the corresponding ones of the compressive measurements $Y_1, Y_2, \ldots Y_M$. Furthermore, each measurement basis $b_1, b_2, \ldots b_M$ in the compressive basis matrix 120 is itself an array of N values corresponding to the number N of aperture elements of the array 220.

For example, for the embodiment illustrated in FIG. 2, each compressive basis $b_k$ ($k \in [1 \ldots M]$) of the compressive basis matrix 120 is a set of values $b_k[1]$ to $b_k[64]$ where each value may be "0" or "1", or a real value between "0" and "1", which corresponds to and determines the state (e.g., fully closed, fully opened, or a state in-between) of a respective aperture element in the 8×8 aperture array 220. Accordingly, $b_k[1]$ may positionally correspond to and determine the state (e.g., opened or closed) of the first element 220[1,1] of the array 220 while $b_k[64]$ may positionally correspond to and determine the state of the last element 220[8,8] of the array 220.

A given compressive basis $b_k$ is used to produce a corresponding compressive measurement $Y_k$ for a time $t_k$ as follows. The respective values $b_k[1]$ to $b_k[64]$ are used to set the state (fully opened, fully closed or partially opened or closed) of the corresponding elements of array 220 in FIG. 2 to acquire the compressive measurement $Y_k$ corresponding to time $t_k$.

In this regard, a binary value "1" in the basis $b_k$, may indicate fully opening (or enabling) the corresponding element in the array 220, whereas the value of "0" in the basis $b_k$, may indicate fully closing (or disabling) the corresponding element in the array 220 (or vice versa). As noted before, a real value between "0" and "1" in the basis $b_k$, may also indicate partially opening or closing the corresponding element, where only a portion of the light is allowed to pass through that corresponding element while another portion is the light is prevented from passing through the corresponding element. The sum or aggregate of the light reaching the detector 230 via the array 220 may be detected as the determined value of the compressive measurement $Y_k$ corresponding to the time $t_k$.

The compressive basis matrix 120 may be determined using any desired compressive scheme. For example, in one aspect, at least one, or each, measurement basis $b_k$ ($k \in [1 \ldots M]$) of the compressive basis matrix 120 may be constructed as a randomly (or pseudo-randomly) permutated Walsh-Hadamard matrix. In other aspects, other types of compression schemes/matrices may be used as will be understood by those of ordinary skill in the art. For example, in another embodiment at least one, or each, measurement basis $b_k$ ($k \in [1 \ldots M]$) may be constructed as randomly or pseudo-randomly generated real number between 0 and 1. Furthermore, it will be understood that the values of the measurement basis may be binary values, numeric values, text values, or other types of values, which are used for partially or fully enabling or disabling corresponding elements of the array 120.

Mathematically, the relationship representing the application of each of the individual bases $b_1, b_2, b_3, \ldots b_M$ (or rows) of the compressive basis matrix 120 to the N aperture elements $x_1, x_2, x_3, \ldots x_N$ of the aperture array 120 to generate the M compressive measurements $Y_1, Y_2, Y_3, \ldots Y_M$ may be expressed as:

$$\begin{bmatrix} Y_1 \\ Y_2 \\ Y_3 \\ \vdots \\ Y_M \end{bmatrix} = \begin{bmatrix} b_1[1] & b_1[2] & \ldots & b_1[N] \\ b_2[1] & b_2[2] & \ldots & b_2[N] \\ b_3[1] & b_3[2] & \ldots & b_3[N] \\ \vdots & \vdots & \vdots & \vdots \\ b_M[1] & b_M[2] & \ldots & b_M[N] \end{bmatrix} \cdot \begin{bmatrix} x_1 \\ x_2 \\ x_3 \\ \vdots \\ x_N \end{bmatrix}$$

where, as noted previously, M<N to achieve compression.

Having described an example operation of acquiring the compressive measurements 125 in detail, various aspects of the operation of the reconstruction unit 135 will be described next in conjunction with the process 300 illustrated in FIG. 3. It is assumed for the purposes of the discussion below that the compressive measurements 125 include the number M of compressive measurements $Y_1, Y_2, \ldots Y_M$ that are generated, for example, for respective times $t_1, t_2, \ldots t_M$ using respective ones of the compressive bases $b_1, b_2, \ldots b_M$ of a predetermined compressive basis matrix array 120 as described above. The reconstruction unit 135 generates (or reconstructs) a N-pixel image 140 (e.g., for display on a display unit) of the object 110 from the M number of compressive measurements $Y_1, Y_2, Y_3 \ldots Y_M$.

Since each compressive measurement $Y^k$ is acquired for a corresponding time $t_k$, a set of compressive measurements may take a certain duration of time to be captured (e.g., from time $t_1$ to time $t_M$ for compressive measurements $Y_1$ to $Y^M$. As all compressive measurements may represent the same scene, if the object moves during the acquisition of the measurements, the image or video reconstructed from these measurements may not accurately capture the object, and the resulting image or video may have undesirable artifacts such as blurring.

Accordingly, in one aspect the reconstruction unit 135 determines the N-pixel image 140 using a reconstruction basis matrix 150 that is generated and/or updated based on motion data representing the motion of the object 110 relative to the camera unit 115 during the time period from $t_1$ to $t_M$ in which the compressive measurements 125 were acquired. Thus, aspects of the disclosure advantageously may provide a better reconstructed image, especially when the object moves relative to the camera unit during the time the set of compressive measurements are acquired. In one particular aspect, the reconstruction basis matrix 150 is generated by updating or modifying one or more of the compressive bases $b_1, b_2, \ldots b_M$ of the compressive basis matrix 120 based on the relative motion of the object 110 to the camera unit 115.

The reconstruction basis matrix 150 that is generated or updated compensates for the relative motion of the object 110 to the camera unit 115 during one or more of the time periods from time $t_1$ to $t_M$ when the compressive measurements $Y_1, Y_2, Y_3. \ldots Y_M$ are acquired. The reconstruction basis matrix 150 which takes the object motion into account is used by the reconstruction unit to uncompress the M compressive measurements into N-pixel values $I_1, I_2, I_3. \ldots I_N$ of the reconstructed image 140, which may then be converted, for example, into a two dimensional format to realize a two-dimensional image of the object 110 that is suitable for viewing on a display, printing, or further processing.

Figure 3:
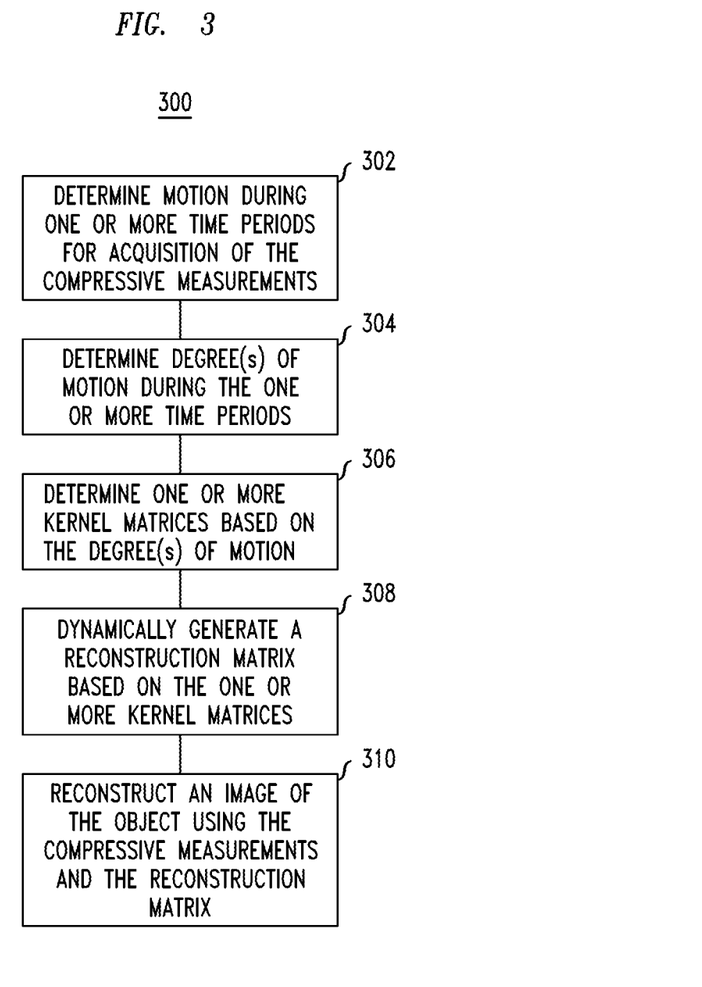
FIG. 3 illustrates an example process for reconstructing an image of the object from the compressive measurements using a reconstruction basis matrix in accordance with various aspects of the disclosure.

Turning now to the process 300 of FIG. 3, in step 302 the process includes determining motion during the one or more time periods for the acquisition of the compressive measurements. The motion may be determined based on a change in position of the object 110 relative to the camera unit 115 from an initial position(s) to a new position(s) during any one or more time instances $t_1$ to $t_M$ in which the compressive measurements $Y_1, Y_2, Y_3. \ldots Y_M$ were generated. The determination that the position of the object 110 changed relative to the camera unit 15 in one or more time periods when the compressive measurements 125 were acquired using the compressive basis matrix 220 may be made in several ways.

In some embodiments, the determination of the motion may be based on panning/tilting motion data received from the camera unit 115, where the camera unit pans (and/or tilts) during the acquisition of the compressive measurements. In some embodiments, the determination of the motion may be made based on motion data indicating the rotation of the earth (e.g., where the object 110 is an astronomical object such as the moon, or a satellite with a known trajectory with respect to the earth or another body). In some embodiments, the determination of the motion may be made based on data provided by one or more sensors (e.g., gyroscopes, accelerometers, or other passive or active sensors) that are located on or in proximity to the object 110 or the camera unit 115, or based on other predetermined or manually provided information. As in the case of the compressive measurements 125 representing compressed image of the object 110, the motion data may be stored (or transmitted) by a storage/transmission unit 130 for further or later processing.

In step 304, the process includes determining the degree of the motion determined during the one or more of the time periods for the acquisition of the compressive measurements in step 302. In some embodiments, the degree of motion may be determined from the motion data as the magnitude of the change in the position of the object 110 in one or more directions relative to the camera unit 115 during a given period of time (e.g., between times $t_{k-1}$ and $t_k$, where ($k \in [1 \ldots M]$)). The motion data may indicate, for example, that the position of the object 110 changed relative to the camera unit 115 from an initial position $i(k-1), j(k-1)$ at time $t_{k-1}$ to a new position $i(k), j(k)$ at time $t_k$, where ($k \in [1 \ldots M]$) during which respective compressive measurements $Y_{(k-1)}$ and $Y_{(k)}$ were generated. The degree of motion for the time duration $t_{k-1}$ to $t_k$ may then be determined as, for example, the distance $d_i(k)=i(k-1)-i(k)$ and $d_j(k)=j(k-1)-j(k)$ using Cartesian coordinates.

In step 306, the process includes determining a kernel matrix based on the degree of motion determined in step 304. For example, a N×N kernel matrix K(k) may be defined such that, if the one dimensional representation of the image 140 is denoted as an array I having a number N values, then K(k)·I represents shifting the position of the object 110 by $d_i(k), d_j(k)$ to compensate for the motion of the object 110 during the given time $t_{k-1}$ and $t_k$. In other words, if the object 115 is at position $i(k), j(k)$ in I, then the kernel matrix K(k) is determined such that the position of the object 115 is shifted to the initial (or previous) position $i(k-1), j(k-1)$ in K(k)·I.

Step 306 may be reiterated to determine a series of kernel matrices K(k) for different times $t_{k-1}$ and $t_k$ during which the object 110 moves (or continues to move) relative to the camera unit 115 when respective compressive measurements $Y_{(k-1)}$ and $Y_{(k)}$ acquired. For example, a first kernel matrix K(1) may be determined based on the determined change of the position of the object 115 between time $t_1$ when $Y_1$ was acquired and time $t_2$ when $Y_2$ was acquired. Subsequently, a second kernel matrix K(2) may be determined based on the determined change of the position of the object 115 between time $t_2$ when $Y_2$ was acquired and time $t_3$ when $Y_3$ was acquired, and so on. As a result, a series of kernel matrices K(k) may be determined in step 306 for k≥2,3,4, ... M.

In step 308, the process includes generating the reconstruction basis matrix 150 using the series of kernel matrices that are determined in step 306 based on the determined motion of the object 110 relative to the camera unit 115. In one aspect, the reconstruction basis matrix 150 is generated based on the compressive basis matrix 120 that was used to generate the compressive measurements 125 as follows.

Assuming that the compressive basis matrix 120 that was used to generate the compressive measurements 125 is expressed as:

$$B = \begin{bmatrix} b_1[1] & b_1[2] & \ldots & b_1[N] \\ b_2[1] & b_2[2] & \ldots & b_2[N] \\ b_3[1] & b_3[2] & \ldots & b_3[N] \\ \vdots & \vdots & \vdots & \vdots \\ b_M[1] & b_M[2] & \ldots & b_M[N] \end{bmatrix}$$

the reconstruction basis matrix R may be generated (or updated) based on the compressive basis matrix B as:

$$R = \begin{bmatrix} b_1[1] & b_1[2] & \ldots & b_1[N] \\ r_2[1] & r_2[2] & \ldots & r_2[N] \\ r_3[1] & r_3[2] & \ldots & r_3[N] \\ \vdots & \vdots & \vdots & \vdots \\ r_M[1] & r_M[2] & \ldots & r_M[N] \end{bmatrix},$$

where $r_k$ is determined as the matrix product:

$$r_k = b_k \Pi_{p=2}^{k} K(p), \text{ or equivalently}$$

$$r_2 = b_1 K(2), r_k = r_{k-1} K(k), k=3, \ldots, M \text{ and,}$$

where it is assumed that the object 110 moves relative to the camera unit 115 during the entire duration in which the compressive measurements $Y_1, Y_2, Y_3 \ldots Y_M$ were acquired using each of the compressive bases $b_1, b_2, \ldots b_M$.

It will be noted that in other embodiments, where, for example, the object does not move relative to the camera unit when a particular basis $b_k$ is used to produce $Y_k$, $r_k$ may be the same as $b_k$. In other words, in some embodiments, the reconstruction basis matrix R differs from the compressive basis matrix B with respect to those compressive bases which were applied duration of the objects movement relative to the camera unit 115, while remaining the same with respect to the other compressive bases. In such instances the kernel matrix that is constructed for a corresponding time duration for which it is determined that there was no relative motion of the object may be an N×N identity matrix.

In step 310, the reconstruction basis matrix 150 that is generated in step 308 is used to generate an image 140 of the object 110 from the compressive measurements 125. For example, in one embodiment, the image 140 may be determined in matrix form as:

$$\min \|W \cdot I\|_1, \text{ subject to:}$$

$$\begin{bmatrix} Y_1 \\ Y_2 \\ Y_3 \\ \vdots \\ Y_M \end{bmatrix} = R \cdot \begin{bmatrix} I_1 \\ I_2 \\ I_3 \\ \vdots \\ I_N \end{bmatrix}$$

where W is a sparsifying operator, I is the one-dimensional matrix representation of the N valued image 140, R is the reconstruction basis matrix generated in step 308, and $Y_1, Y_2, Y_3 \ldots Y_M$ are the compressive measurements 125 acquired using the compressive basis matrix 120. The sparsifying operator may be generated, for example, by using wavelets, or by using total variations.

The process described above may be repeated to generate or update the reconstruction basis matrix to compensate for relative motion of the object to the camera for one or more of a series of images or (frames of a video) that are reconstructed from different sets of compressive measurements over a period of time. It is to be understood that the steps described above are merely illustrative and that existing steps may be modified or omitted, additional steps may be added (e.g., the step of determining a compressive basis matrix and the step of determining compressive measurements using the compressive basis matrix), and the order of certain steps may be altered.

Figure 4:
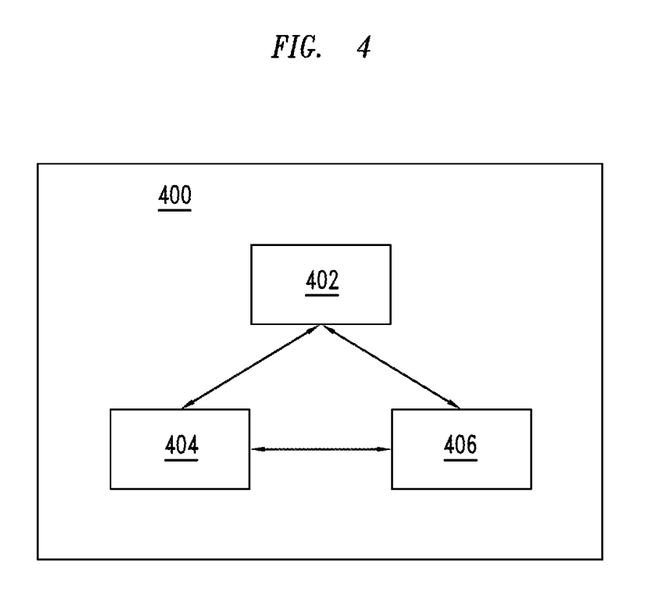
FIG. 4 illustrates an example apparatus for implementing various aspects of the disclosure.

It will be appreciated that one or more aspects of the disclosure may be implemented using hardware, software, or a combination thereof. FIG. 4 depicts a high-level block diagram of an example processing device or apparatus 400 suitable for implementing one or more aspects of the disclosure. Apparatus 400 comprises a processor 402 that is communicatively interconnected with various input/output devices 404 and a memory 406.

The processor 402 may be any type of processor such as a general purpose central processing unit ("CPU") or a dedicated microprocessor such as an embedded microcontroller or a digital signal processor ("DSP"). The input/output devices 404 may be any peripheral device operating under the control of the processor 402 and configured to input data into or output data from the apparatus 400 in accordance with the disclosure, such as, for example, a lens or lensless camera or video capture device. The input/output devices 404 may also include conventional network adapters, data ports, and various user interface devices such as a keyboard, a keypad, a mouse, or a display.

Memory 406 may be any type of memory suitable for storing electronic information, including data and instructions executable by the processor 402. Memory 406 may be implemented as, for example, as one or more combinations of a random access memory (RAM), read only memory (ROM), flash memory, hard disk drive memory, compact-disk memory, optical memory, etc. In addition, apparatus 400 may also include an operating system, queue managers, device drivers, or one or more network protocols which may be stored, in one embodiment, in memory 406 and executed by the processor 402.

The memory 406 may include non-transitory memory storing executable instructions and data, which instructions, upon execution by the processor 402, may configure apparatus 400 to perform the functionality in accordance with the various aspects and steps described above. In some embodiments, the processor 402 may be configured, upon execution of the instructions, to communicate with, control, or implement all or a part of the functionality with respect to the acquisition or the reconstruction of the compressive measurements as described above. The processor may be configured to determine or receive motion data, process the motion data to generate one or more kernel matrices, and to generate the reconstruction basis matrix based on the kernel matrices as described above.

In some embodiments, the processor 402 may also be configured to communicate with and/or control another apparatus 400 to which it is interconnected via, for example a network. In such cases, the functionality disclosed herein may be integrated into each standalone apparatus 400 or may be distributed between one or more apparatus 400. In some embodiments, the processor 402 may also be configured as a plurality of interconnected processors that are situated in different locations and communicatively interconnected with each other.

While a particular apparatus configuration is shown in FIG. 4, it will be appreciated that the present disclosure not limited to any particular implementation. For example, in some embodiments, all or a part of the functionality disclosed herein may be implemented using one or more application specific integrated circuits (ASICs), field programmable gate arrays (FPGAs), or the like.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. A compressive sense imaging system, the system comprising:
a processing device configured to:
determine at least one kernel matrix based on relative motion of an object during a time period corresponding to acquisition of at least one of a plurality of compressive measurements representing a compressed image of the object;
determine a reconstruction basis matrix to compensate for the relative motion of the object during the time period based on the at least one kernel matrix; and,
generate an uncompressed image of the object from the plurality of compressive measurements using the reconstruction basis matrix.

2. The compressive sense imaging system of claim 1, wherein the processing device is further configured to:
determine the reconstruction basis matrix by applying the at least one kernel matrix to at least one basis of a compressive basis matrix used to acquire the compressive measurements.

3. The compressive sense imaging system of claim 1, wherein the processing device is configured to:
determine the at least one kernel matrix such that a matrix operation between the at least one kernel matrix and a one-dimensional representation of the uncompressed image represents shifting the position of the object in the one-dimensional representation of the uncompressed image to a previous position of the object based on the relative motion of the object.

4. The compressive sense imaging system of claim 1, wherein the processing device is further configured to:
determine the relative motion of the object during the time period based on motion data from one or more sensors.

5. The compressive sense imaging system of claim 4, wherein the processing device is further configured to:
determine a degree of the relative motion of the object during the time period based on the motion data.

6. The compressive sense imaging system of claim 4, wherein the processing device is further configured to:
determine the at least one kernel matrix using the determined degree of relative motion of the object.

7. The compressive sense imaging system of claim 1, wherein the processing device is further configured to:
apply a sparsifying operator to generate the image of the object from the plurality of compressive measurements using the reconstruction basis matrix.

8. The compressive sense imaging system of claim 1, further comprising:
a camera unit configured to acquire the plurality of compressive measurements.

9. The compressive sense imaging system of claim 8, wherein the camera unit is a lensless camera unit.

10. The compressive sense imaging system of claim 8, wherein the camera unit comprises an array of selectable aperture elements and a detector, and wherein the processing device is further configured to:
selective enable or disable one or more of the aperture elements of the array based on at least one basis in a compressive basis matrix to acquire at least one of the plurality of compressive measurements during the time period, the at least one of the plurality of compressive measurements being determined based on an aggregated sum of light detected by the detector during the time period.

11. A method for compressive sense imaging, the method comprising:
determining, using a processor, at least one kernel matrix based on relative motion of an object during a time period corresponding to acquisition of at least one of a plurality of compressive measurements representing a compressed image of the object;
determining a reconstruction basis matrix to compensate for the relative motion of the object during the time period based on the at least one kernel matrix; and,
generating an uncompressed image of the object from the plurality of compressive measurements using the reconstruction basis matrix.

12. The method of claim 11, wherein:
determining the reconstruction basis matrix further includes applying the at least one kernel matrix to at least one basis of a compressive basis matrix used to acquire the compressive measurements.

13. The method of claim 11, wherein:
determining the at least one kernel matrix includes determining the at least one kernel matrix such that a matrix operation between the at least one kernel matrix and a one-dimensional representation of the uncompressed image represents shifting the position of the object in the one-dimensional representation of the uncompressed image to a previous position of the object based on the relative motion of the object.

14. The method of claim 11, further comprising:
using motion data from one or more sensors for determining the relative motion of the object during the time period.

15. The method of claim 14, further comprising:
determining a degree of the relative motion of the object during the time period using the motion data.

16. The method of claim 15:
using the determined degree of relative motion of the object for determining the at least one kernel matrix.

17. The method of claim 11, further comprising:
applying a sparsifying operator for generating the image of the object from the plurality of compressive measurements using the reconstruction basis matrix.

18. The method of claim 11, further comprising:
acquiring the plurality of compressive measurements using a compressive basis matrix during the time period.

19. The method of claim 18, further comprising:
determining an aggregated sum of light output by a detector for acquiring at least one of the plurality of compressive measurements by enabling or disabling one or more aperture elements of an aperture array based on at least one basis in the compressive basis matrix during the time period.

20. A non-transitory computer-readable medium including one or more instructions for configuring a processor for:
determining at least one kernel matrix based on relative motion of an object during a time period corresponding to acquisition of at least one of a plurality of compressive measurements representing a compressed image of the object;
determining a reconstruction basis matrix to compensate for the relative motion of the object during the time period based on the at least one kernel matrix; and,
generating an uncompressed image of the object from the plurality of compressive measurements using the reconstruction basis matrix.

* * * * *